(No Model.) 4 Sheets—Sheet 3.
P. DUNLOP.
CONDENSER.
No. 560,198. Patented May 19, 1896.
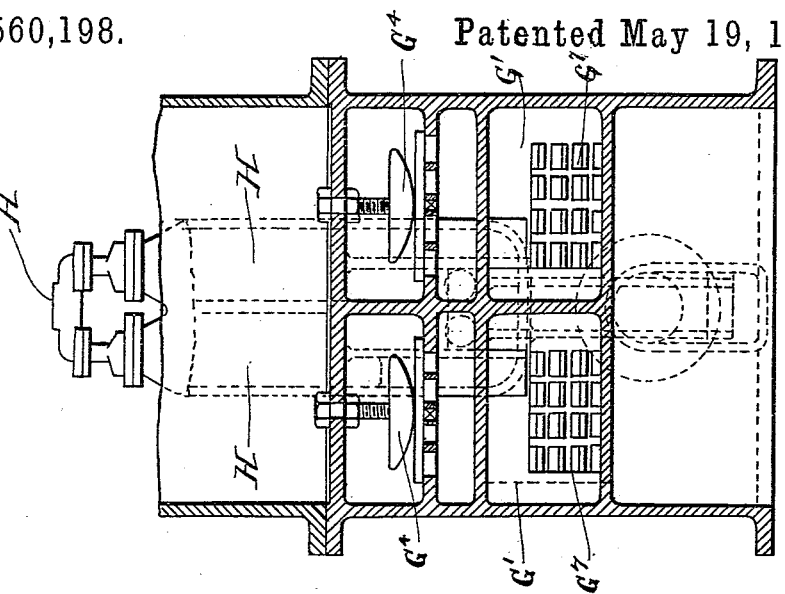
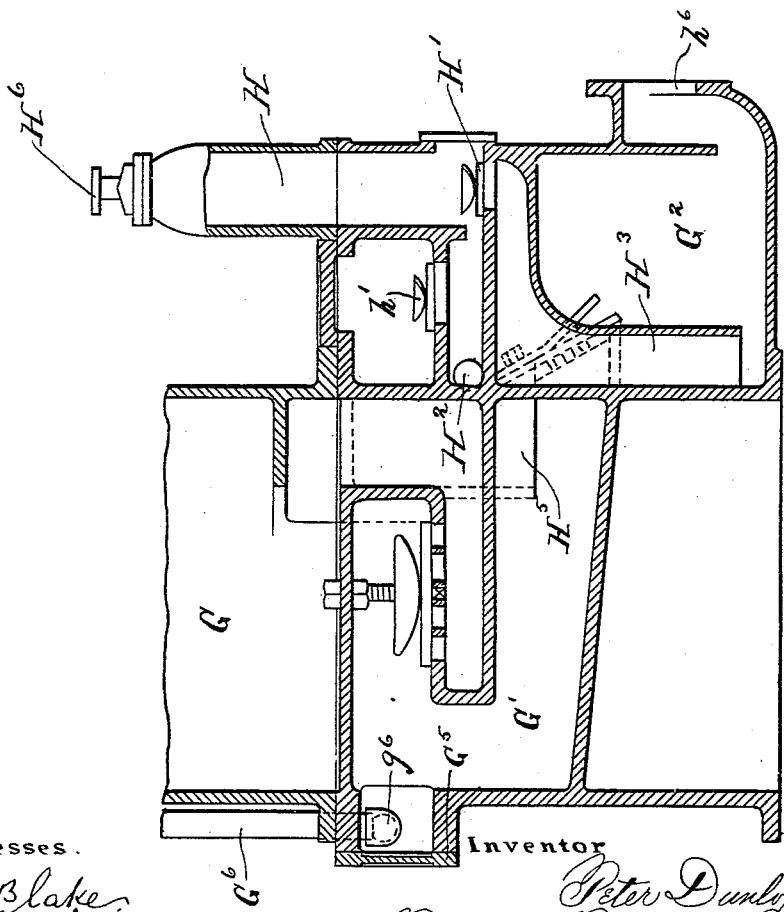
Witnesses
C. F. Blake
Thos. B. McGregor
Inventor
Peter Dunlop
By Banning & Banning and Sheridan
Attorneys

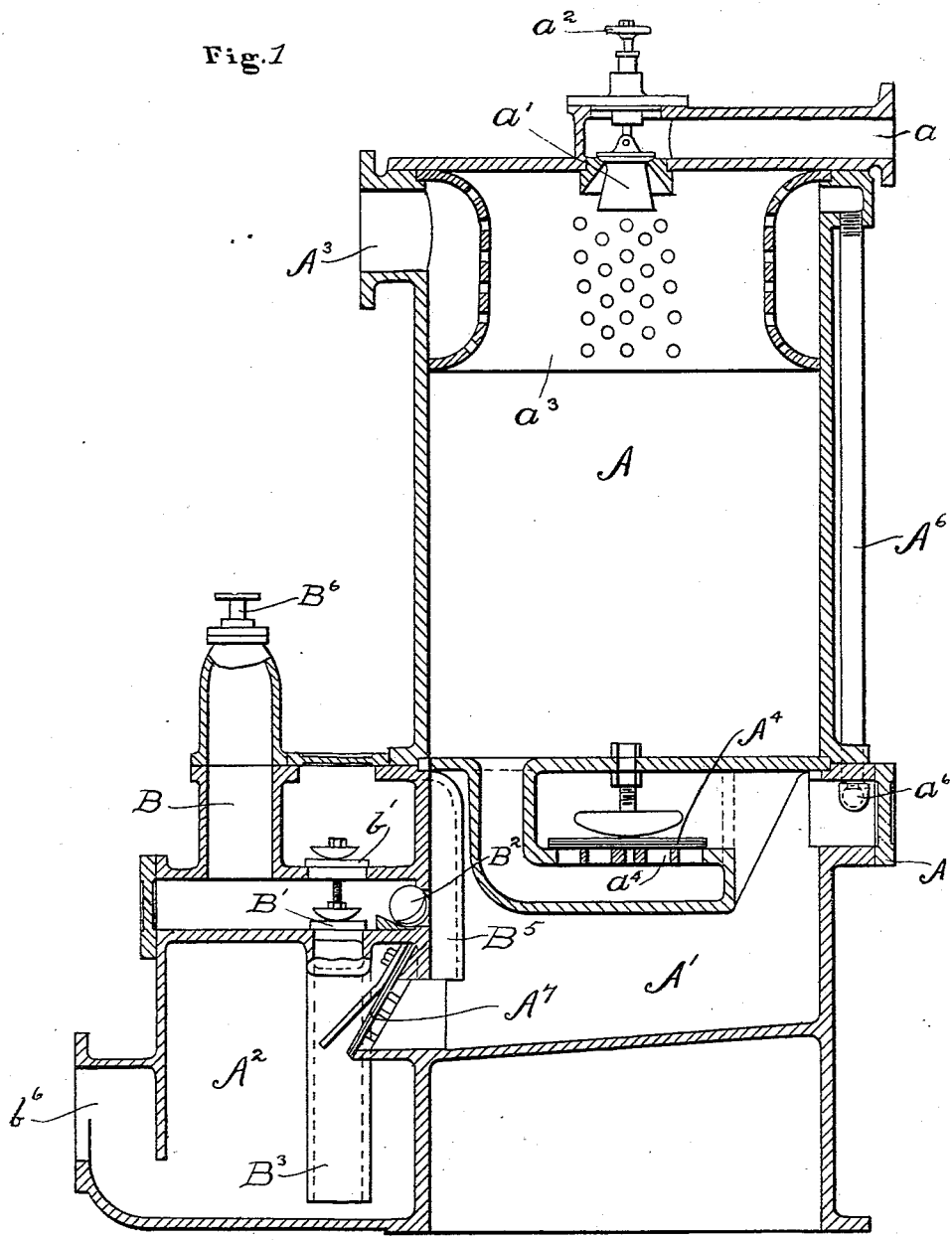

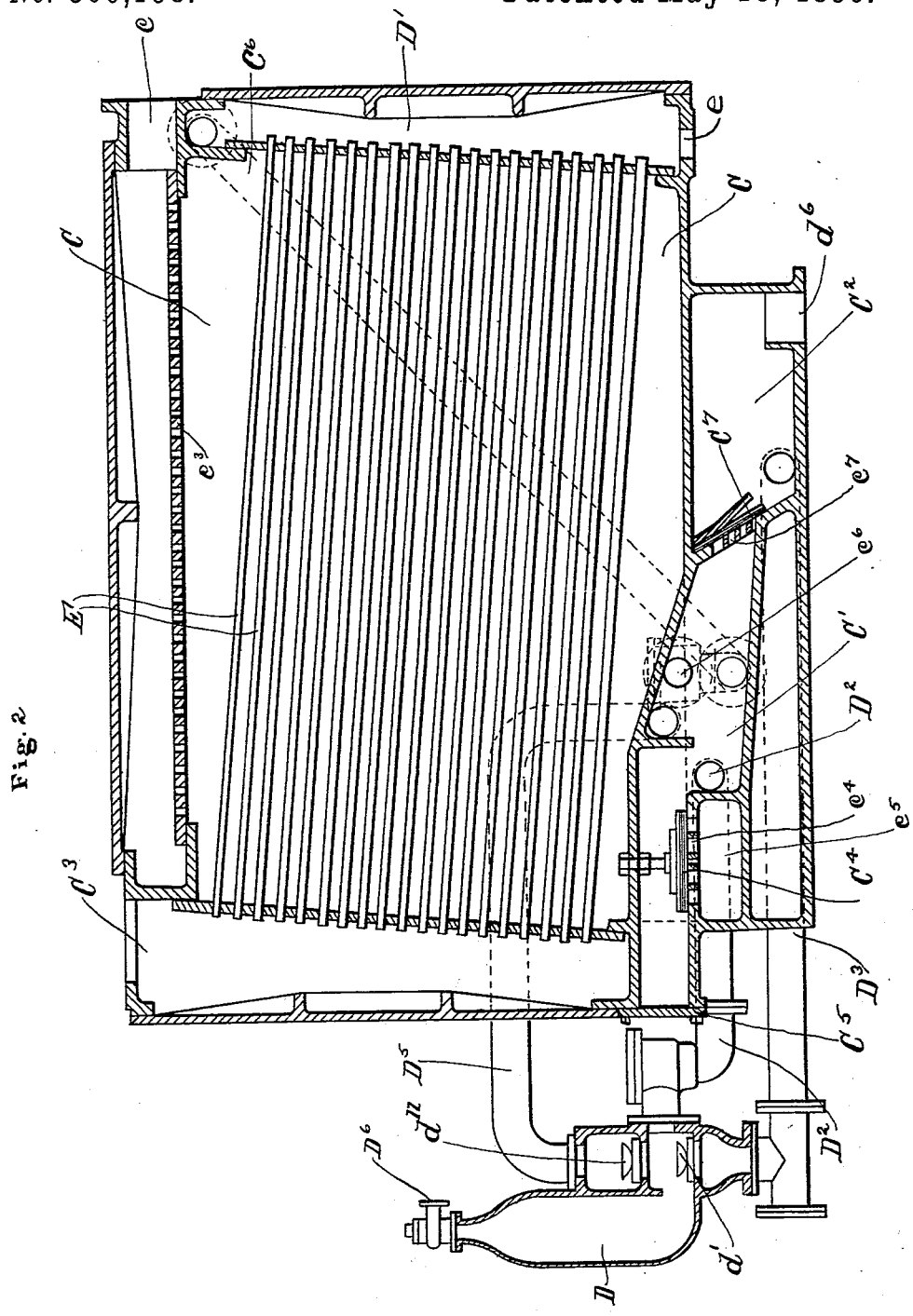

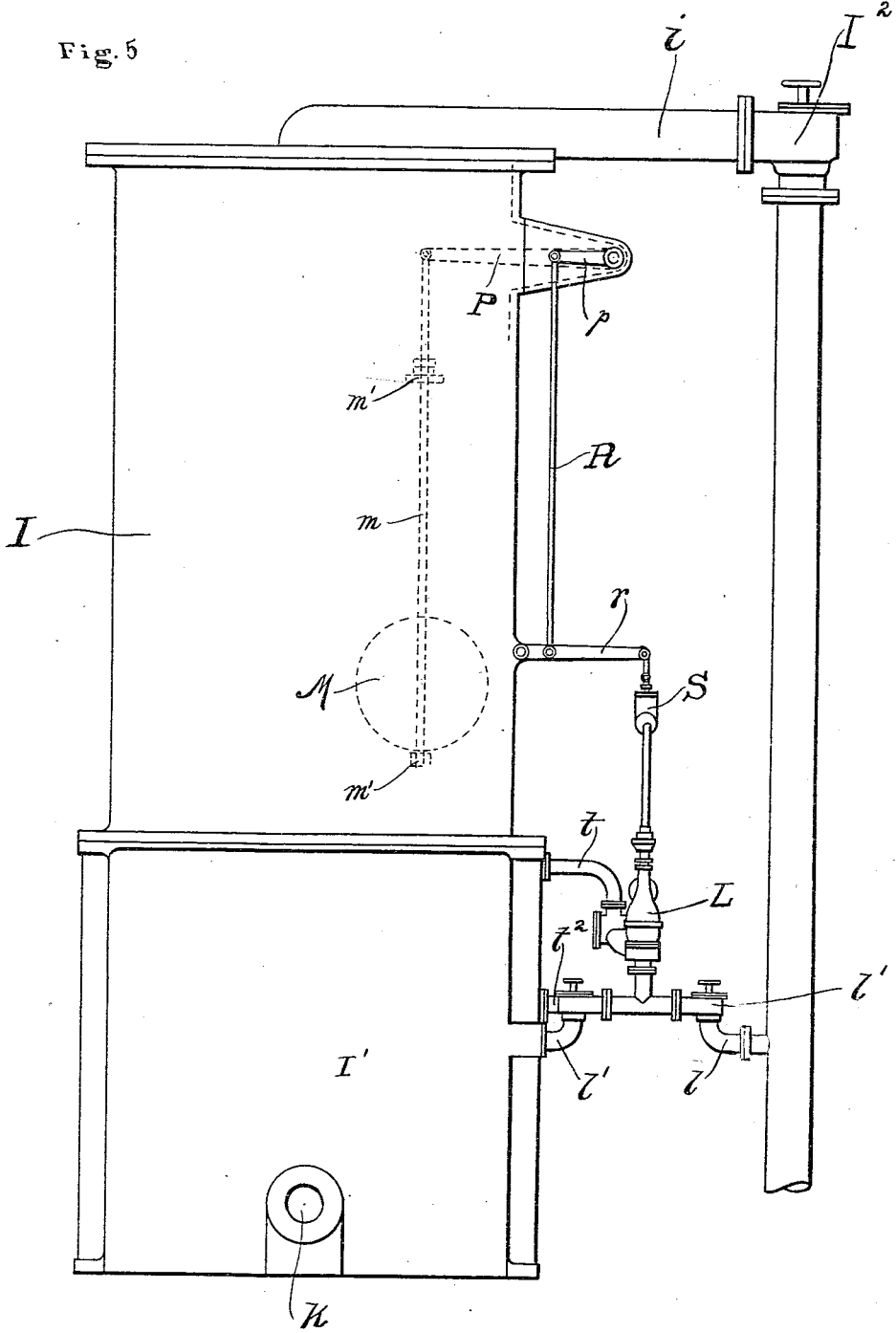

UNITED STATES PATENT OFFICE.

PETER DUNLOP, OF LONDON, ENGLAND.

CONDENSER.

SPECIFICATION forming part of Letters Patent No. 560,198, dated May 19, 1896.

Application filed January 22, 1895. Serial No. 535,772. (No model.)

*To all whom it may concern:*

Be it known that I, PETER DUNLOP, a subject of the Queen of Great Britain, residing at Clapham, London, S. W., England, have invented certain new and useful Improvements in Condensers, of which the following is a specification.

This invention relates particularly to the mode and apparatus by which steam and other vapors are condensed, and has for its object the application to steam-engines, vacuum-pans, surface condensers, machines, or other apparatus in which vapor is to be condensed of an improved form of condensing apparatus which dispenses with the air and water pumps generally used for such purposes; and the invention consists in the features and combinations hereinafter described and claimed.

In my invention I employ, as above stated, a steam-pump known to practical men as the "pulsometer," "pulsator," "aquathrustic," or other designations in use for this class of pump.

I use the term "pulsometer" in my description for the sake of simplicity and clearness.

In the accompanying drawings, Figure 1 represents one form of my improvement in vertical section. Fig. 2 shows a surface condenser in vertical section with my improved apparatus applied thereto. Figs. 3 and 4 are modifications shown in vertical section as applied to high-speed engines, and Fig. 5 another modification as applied to slow-going engines.

Describing Fig. 1, the first modification of my invention, A is an upper chamber; A', a lower chamber; $A^2$, the hot-well or discharge-chamber, which is open to the air, and B the pulsometer. $a$ is the inlet-pipe for the condensing-water; $a'$, the injection-valve; $a^2$, a hand-wheel on the injection-valve for regulating the admission of the injection; $A^3$, the inlet—of which there may be more than one—for the steam or vapor to be condensed, and $a^3$ a perforated shell for subdividing the inlet vapor before it enters the upper chamber. At the bottom of the upper chamber A is a valve $A^4$ on a grating $a^4$, which when opened allows communication between the upper and lower chambers A and A'. $A^5$ is a door to furnish access to valve $A^4$; $A^6$, an air-pipe which is provided with a check-valve $a^6$, which furnishes an air-passage between the upper and lower chambers. At the bottom of the chamber A' is the foot or discharge valve $A^7$ on a grating $a^7$, which opens into the hot-well. The pulsometer shown is of the one-barrel type, having a suction-valve B', discharge-valve $b'$, and non-return air-pipe $B^2$ between the pulsometer and lower chamber to permit the contained air in the lower chamber to pass into the pulsometer. $B^3$ is a suction-pipe for the pulsometer opening into the hot-well; but it may open into and furnish communication with any other source of hot-fluid supply. The lower chamber is also in communication with the pulsometer by passage $B^5$, leading from above the pulsometer discharge-valves to eject the contents of such chamber. $B^6$ is the steam-inlet to the pulsometer, and $b^6$ the outlet or waste from the hot-well or discharge-chamber.

The action of the condenser is as follows: The pulsometer being filled or charged with water from the hot-well or other source and steam being admitted through pipe $B^6$, the water is forced out of the pulsometer through the discharge-valve $b'$ and passage $B^5$ into the lower chamber. This action forces any water and vapor contained in such chamber out through the foot or flap valve $A^7$ into the hot-well, from which the condensed water may be taken to feed boilers or for other purposes. When the steam in the pulsometer enters the opening or passage $B^5$, an instantaneous condensation takes place in the manner well known in pulsometers, forming a vacuum in the pulsometer. The check-valve in pipe $B^2$ opens and allows a vacuum to be formed in the lower chamber, while the foot-valve $A^7$ is kept closed by atmospheric pressure in the hot-well. The valve $A^4$, between the upper and lower chambers, opens and allows the contents of the upper chamber to pass through into the lower chamber. The check-valve in pipe $A^6$ will also open if there is any contained vapor in the upper part of the chamber A which has failed to pass out by the valve in the lower portion. At the same time as these actions are taking place the suction-valve B' has opened and filled the barrel of the pulsometer with water, against which the check-valve in pipe $B^2$ closes to prevent water entering the lower chamber while the pulsometer is making its suction-stroke. The pulsometer being filled with water and air, steam is again admitted and the water and air forced out of the pulsometer through its discharge valve and passage $B^5$ into the lower chamber. During this period valves $A^4$ and $a^6$ close; but the foot-valve $A^7$ opens, thereby discharging the contents of the lower chamber into the hot-well. The upper and lower chambers are exhausted by the pulsometer on starting, and so cause the condensing-water to enter by valve $a'$ and pipe $a$, as if drawn by an ordinary pump. The exhaust-steam or vapor is condensed on entering through branch opening $A^3$, and so on continuously.

The steam for actuating the pulsometer is a few pounds above that of the atmosphere, so as to enable the pulsometer to eject the contents of the lower chamber into the air, if desired. If the steam supply to the pulsometer is taken from a boiler or similar source, a reducing-valve should be used to obtain the required pressure to work the apparatus. The supply can be taken from the steam-chest of an engine or from the receiver in the case of compound engines.

It is to be understood that the pulsometer part of the apparatus only acts to eject the contents and create a vacuum in the lower chamber once in about every ten strokes of an engine, and to the amount of condensation-water required will be added about ten per centum of the total quantity.

Fig. 2 represents the improved condensing apparatus as applied to surface condensers. A vertical section is shown of an ordinary tubular condenser; but other forms of condensing-surface can be used. Describing this figure, C is the upper chamber; $C'$, the lower chamber; $C^2$, the hot-well or discharge member, which is open to the air; D, the pulsometer; $c$, an inlet-pipe for the condensing-water; $C^3$, the inlet branch, of which there may be more than one, of the steam or vapor to be condensed; $c^3$, a perforated plate interposed between the upper chamber and the inlet for the condensing-water; $C^4$, an automatic valve resting upon a grating $c^4$, which opens and closes the opening or passage $c^5$, that communicates with the upper chamber, so that as this valve is opened and closed the contents of the upper chamber may be passed into the lower chamber, or vice versa; $C^5$, a door to furnish access to the valve $C^4$; $C^6$, an air-pipe fitted with a check-valve $c^6$ to furnish desired communication between the upper portion of a second discharge-chamber $D'$ and the lower chamber. At the bottom of the lower chamber is a feed or discharge valve $C^7$, resting normally on the grating $c^7$, which valve opens and closes the communication between the lower chamber and the hot-well. The pulsometer part of the apparatus is shown in the position to the left of the figure for the sake of clearness; but it may occupy any other relative position found convenient to the particular case. It is provided with a suction-valve $d'$ and discharge-valve $d''$. An air-pipe $D^2$ is interposed between the pulsometer and lower chamber and is provided with a check-valve, (not shown,) so that the contained air of the lower chamber may pass into the chamber of the pulsometer. $D^3$ is a suction-pipe for the pulsometer opening into the hot-well; but like the construction shown in Fig. 1 it may open into and furnish communication with some other source of hot-fluid supply. Communication is furnished the pulsometer above its discharge-valve by means of the pipe $D^5$, which leads therefrom into the lower chamber, so as to eject the contents of such chamber. $D^6$ is the steam-inlet to the pulsometer, and $d^6$ the outlet or waste channel from the hot-well or discharge-chamber. The main action of this apparatus is the same as that described in connection with Fig. 1, so that it will be unnecessary to enter into a minute description of the action, as it will be readily understood by those skilled in the art. The steam or vapor to be condensed enters by the inlet $C^3$ and passes through the tubes E, in which it is condensed by the water of the upper chamber which surrounds the tubes. The products of condensation pass out of the tubes into the secondary discharge-chamber $D'$, where they can be drawn off through the outlet $e$ by a feed-water pump. The air from this secondary discharge-chamber passes through the air-pipe $C^6$ into the lower chamber, where it may be acted upon by the pulsometer. The rest of the action of the apparatus is similar to that shown and described in connection with Fig. 1.

Figs. 3 and 4 show a second modification of a condenser in vertical section with my improvement attached thereto. In this modification I apply double condensers. Describing it, G is the upper chamber; $G'$ $G'$, the double chambers; $G^2$, a common hot-well or discharge-chamber, which is open to the air; H H, the double-barreled pulsometer, which is actuated by one steam-valve between its two barrels, as is the common practice, the valve opening alternately to the barrels and the resulting action being that one or other of the lower chambers $G'$ is being acted upon by the double pulsometer, and so insures a more continuous discharge from the common upper chamber G. This action increases the efficiency of the condenser, particularly where a number of vessels have to be exhausted or when applied to high-speed engines. The apparatus is in substance the same as that described in connection with Figs. 1 and 2, in which it will be understood that the upper chamber is supplied with an inlet for the condensing-water, and may also be supplied with an injection-valve to regulate the admission of injection. It should also be supplied with an inlet or inlets for the steam or vapor to be condensed. $G^4$ $G^4$ are valves that close and open the passages between the upper chamber and the double lower chamber; $G^5$, a door to furnish access to the valves $G^4$; $G^6$, an air-pipe fitted with a check-valve $g^6$, that furnishes air communication between the upper portion of the upper chamber and the lower chamber. Each of the lower chambers is provided with feed or discharge valves $G^7$, that open and close the communication existing between the hot-well and the lower chamber. The pulsometer, as in the previous figures, is of the barrel type and is provided with a suction-valve $H'$ and a discharge-valve $h'$. This suction-valve opens and closes a passage or suction-pipe $H^3$ and furnishes communication between the hot-well and pulsometer. An air-pipe $H^2$, which is provided with a check-valve, furnishes communication between the pulsometer and lower chamber to permit any air contained in such lower chamber to pass into the pulsometer. A passage $H^5$ (shown in dotted lines in Fig. 3) furnishes communication between the lower chamber and the pulsometer above its discharge-valve to eject the contents of such lower chamber. $H^6$ is the steam-inlet to the double pulsometer, and $h^6$ the discharge-outlet for the hot-well. From this short description of this modification illustrated by Figs. 3 and 4 the working of the apparatus will be readily discerned, which is practically the same as that described in connection with Figs. 1 and 2. The advantages above stated are apparent in that it provides for a continuous discharge, which increases the efficiency of the condenser and enables it to be more readily used with high-speed or large engines.

Fig. 5 shows another modification of condenser to which my improvements are attached. In this instance the condenser may be of any size and shape, and is provided with an upper chamber I, a lower chamber I', and a hot-well, (not shown,) but the exit K of which is shown. The relation between the three chambers, intermediate mechanism, and pulsometer is substantially the same as that described in connection with the preceding figures, so that it will not be necessary to go into any detailed description of the same.

$i$ is the inlet for the condensing-water, which is provided with an injection-valve $I^2$ to regulate the admission of the injection. $l$ is an additional suction-pipe to the pulsometer, which is fitted with a compound check and closing valve $l'$. A float M is inserted in the upper chamber and fitted loosely upon a rod $m$, so that as the chamber is filled the float rises and acts upon the upper tappet $m'$ to raise the rod, and by means of the levers P and $p$, rod R, and levers $r$ the steam-valve S on the pulsometer steam-pipe is opened, so that steam is admitted to the pulsometer, the reverse action taking place when the float descends. This pulsometer has communication, by means of the pipes $t$, with its discharge-valve and the lower chamber to eject the contents, and, by means of a suction-pipe $t'$, with a hot-well and pipes $t^2$, again with the lower chamber to draw out the contained air of the same. This modification is applicable to slow-going engines where condensation is only required at long intervals of time. It is to be understood that the discharge from the lower chamber may be raised to a higher level than the condenser, if required, and that the temperature of the discharge can be regulated by the quantity of steam admitted into the pulsometer.

I do not claim that the division of a condenser into an upper and lower chamber is new, neither do I consider that the application of a pulsometer to draw off the contents of the condenser directly is new. I do consider, however, that the application of the pulsometer indirectly—that is, to a second chamber, so that the contents of such chamber do not pass directly through, but are ejected by the pulsometer—is new, thus making it applicable to condensers, so that great efficiency of such apparatus is thereby attained.

I claim—

1. In a condensing apparatus, the combination of a receptacle provided with an upper chamber and a lower chamber adapted to receive vapor and condensing-water, and a pulsometer connected with a source of steam supply and the lower chamber to eject the contents of such chamber and form a vacuum therein, substantially as described.

2. In a condensing apparatus, the combination of a receptacle provided with an upper chamber connected with a source of steam or vapor supply and a source of condensing-water, a lower chamber connected with the upper chamber and provided with an educt-opening, and a pulsometer connected with a source of steam supply and the lower chamber to eject the contents of such chamber and form a vacuum therein, substantially as described.

3. In a condensing apparatus, the combination of a receptacle provided with an upper and a lower chamber, an inlet to introduce condensing-water in upper chamber, an inlet to introduce steam or vapor in such upper chamber, a piece of perforated material interposed between the vapor-inlet and the body of such chamber, a check-valve interposed between the upper and lower chambers, a hot-well connected with the lower chamber, and a pulsometer connected with a source of steam supply, the hot-well and the lower chamber to eject the contents of such chamber into the hot-well and form a vacuum in such lower chamber, substantially as described.

PETER DUNLOP.

Witnesses:
ERNEST R. WELCH,
HARRY BROWN.